United States Patent
Solonenko et al.

(10) Patent No.: US 12,352,953 B2
(45) Date of Patent: Jul. 8, 2025

(54) MULTIMODE COUPLING FOR FIBER WAVEGUIDE

(71) Applicant: OneLight Sensing, LLC, San Jose, CA (US)

(72) Inventors: Michael G. Solonenko, San Diego, CA (US); Francis G. Muennemann, Menlo Park, CA (US)

(73) Assignee: OneLight Sensing, LLC, San Jose, CA (US)

( * ) Notice: Subject to any disclaimer, the term of this patent is extended or adjusted under 35 U.S.C. 154(b) by 274 days.

(21) Appl. No.: 17/886,021

(22) Filed: Aug. 11, 2022

(65) Prior Publication Data
US 2023/0049757 A1   Feb. 16, 2023

Related U.S. Application Data

(60) Provisional application No. 63/233,172, filed on Aug. 13, 2021.

(51) Int. Cl.
*G02B 26/10* (2006.01)
*G02B 26/08* (2006.01)

(52) U.S. Cl.
CPC ........ *G02B 26/103* (2013.01); *G02B 26/0875* (2013.01)

(58) Field of Classification Search
CPC ................ G02B 26/103; G02B 26/0875
See application file for complete search history.

(56) References Cited

U.S. PATENT DOCUMENTS

| | | | |
|---|---|---|---|
| 3,486,808 A | 12/1969 | Hamblen | |
| 7,015,454 B2 | 3/2006 | Stone | |
| 8,432,542 B2 | 4/2013 | Marple et al. | |
| 9,541,715 B2 | 1/2017 | Aoki | |
| 2004/0062478 A1* | 4/2004 | Ludington | G02B 6/327 385/33 |
| 2005/0163439 A1 | 7/2005 | Vanniasinkam et al. | |
| 2018/0017734 A1* | 1/2018 | Pradhan | G02B 6/276 |
| 2020/0011995 A1 | 1/2020 | Send et al. | |

(Continued)

OTHER PUBLICATIONS

Gilsdorf, R. W. et al., "Single-mode fiber coupling efficiency with graded-index rod lenses," Appl. Opt., vol. 33, Issue. 16, Jun. 1, 1994, pp. 3440-3445.

(Continued)

*Primary Examiner* — Tina Wong
(74) *Attorney, Agent, or Firm* — Fenwick & West LLP

(57) ABSTRACT

In an example, an optical system includes a fiber, a detector, and a gradient-index (GRIN) lens assembly. The GRIN lens assembly is positioned between the fiber and the detector and couples light from an exit aperture of the fiber onto the detector. The spot size of light exiting the fiber is larger than a spot size of light exiting the GRIN lens assembly. Additionally, the spot area of light exiting the GRIN lens assembly may be smaller than a sensing area of the detector. Among other advantages, the GRIN lens assembly increases the amount of light coupled onto the detector from the fiber. Additionally, the GRIN lens assembly may make the optical system more robust against vibrations (and other factors) that change the energy distribution of light exiting the fiber.

20 Claims, 7 Drawing Sheets

(56) References Cited

U.S. PATENT DOCUMENTS

2020/0284986 A1    9/2020  Faulhaber et al.

OTHER PUBLICATIONS

Gomez-Reino, C, et al., "Design of GRIN optical components for coupling and interconnects," Laser & Photonics Reviews, vol. 2, No. 3, Jul. 7, 2008, pp. 203-215.
Mohammed, W. S. et al., "All fiber on-axis coupling scheme between single mode fiber and GRIN fiber," Journal of Modern Optics, vol. 55, No. 7, Apr. 10, 2008, pp. 1033-1049.
Palais, J. C., "Fiber coupling using graded-index rod lenses," Appl. Opt., vol. 19, Issue. 12, Jun. 15, 1980, pp. 2011-2018.
RP Photonics Encyclopedia, "Gradient-index Lenses," archived Jul. 27, 2021, nine pages [Online] [Retrieved from the Internet Archive on May 19, 2023] <URL: https://web.archive.org/web/20210727031325/https:/www.rp-photonics.com/gradient_index_lenses.html>.
PCT International Search Report and Written Opinion, PCT Application No. PCT/US2022/040070, Oct. 27, 2022, 14 pages.

\* cited by examiner

MULTIMODE COUPLING FOR FIBER WAVEGUIDE

CROSS-REFERENCE TO RELATED APPLICATION

This application claims priority to U.S. Provisional Patent Application Ser. No. 63/233,172, "Enhanced Multimode Optical Coupling for Fiber Waveguides," filed on Aug. 13, 2021, the subject matter of which is incorporated herein by reference in its entirety.

GOVERNMENT RIGHTS LEGEND

This invention was made with government support under N68335-21-C-0800 awarded by the Department of the Navy. The government has certain rights in the invention.

BACKGROUND

1. Technical Field

This disclosure relates generally to optical coupling, and more particularly, to coupling light from an optical fiber to an optical detector.

2. Description of Related Art

In various optical systems, light may be directed to an optical detector via an optical fiber.

SUMMARY

Some systems (e.g., optical communication systems) typically directly couple (e.g., directly connect) an exit aperture of the fiber to the detector. However, for some communication types (e.g., high bandwidth communications), the detector size is smaller than a spot size of light exiting the fiber. With signal distributed over multiple optical modes, small disturbances in the fiber (e.g., vibration) can significantly alter the signal's spatial distribution near the detector. A small, high-bandwidth detector is selectively sensitive to the optical modes, and signal flickering between modes is seen by the detector as signal variation. The variation is indistinguishable from other interference and thereby causes loss of communication bandwidth and reliability. In some cases, a single hemispherical lens may be placed between the fiber and the detector to make detector response more uniform between modes. This can reduce the unwanted fluctuations. However, the fluctuation may still be too high for certain optical systems.

The limitations described above are overcome by an optical system that includes an optical fiber, an optical detector, and a gradient-index (GRIN) lens assembly. The optical detector detects light incident upon it. The GRIN lens assembly is positioned between the optical fiber and the optical detector and couples light from an exit aperture of the optical fiber onto the optical detector. The spot size of light exiting the optical fiber is larger than a spot size of light exiting the GRIN lens assembly. However, the spot area of light exiting the GRIN lens assembly may be smaller than a sensing area of the detector. The GRIN lens assembly may include a first GRIN lens configured to collimate light from the fiber and a second GRIN lens configured to focus the collimated light toward the optical detector. Among the advantages, the GRIN lens assembly increases the amount of light coupled onto the detector from the fiber. Additionally, the GRIN lens assembly makes the optical system more robust against vibrations (and other factors) that change the energy distribution of light exiting the fiber.

The above description relates to an optical system that couples light from an exit aperture of a fiber to a detector via the GRIN lens assembly. More generally, some embodiments relate to an optical system that couples light from an exit area of an optical component to a detector via the GRIN lens assembly. The exit area refers to an exit aperture, a focal plane, or focal point of the optical component. Example optical components include a telescope (exit area is a focal plane or point of the telescope), a microscope (exit area is a focal plane or point of the telescope), or a fiber (exit area is an exit aperture). Furthermore, in some embodiments, the detector can be replaced with other optical components, such as a single mode fiber.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
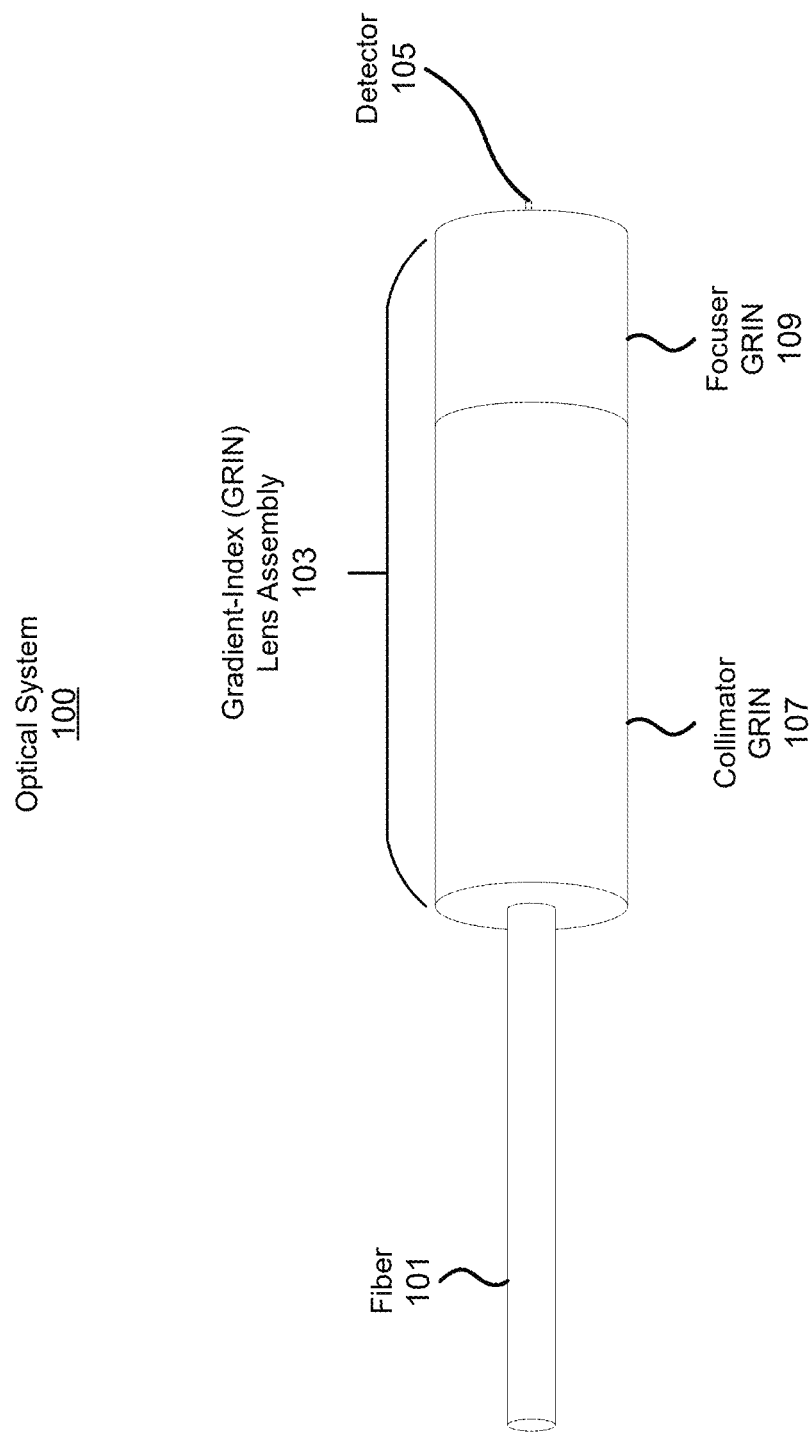
FIG. 1A is a perspective diagram of an optical system, according to an embodiment.

FIG. 1A is a perspective diagram and 1B is a side view diagram of an optical system 100 that includes an optical fiber 101, an optical detector 105, and a gradient-index (GRIN) lens assembly 103, according to some embodiments. Specifically, the fiber 101, GRIN assembly 103, and detector 105 are optically coupled together so that light (indicated by the dotted lines in FIG. 1B) propagates from the fiber 101, through the GRIN assembly 103, to the detector 105.

Figure 1B:
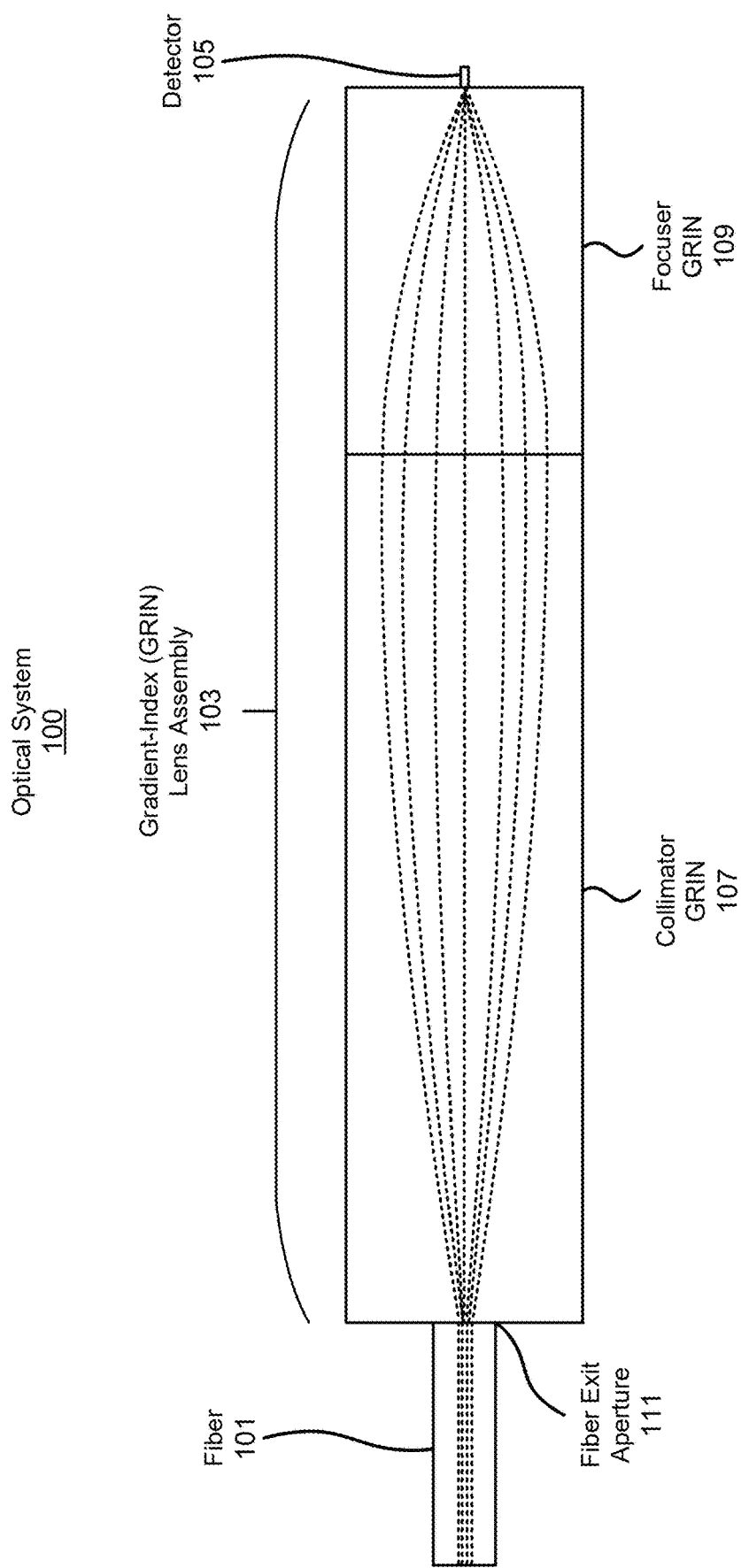
FIG. 1B is a side view diagram of the optical system in FIG. 1A, according to an embodiment.

The optical fiber 101 is a flexible optical waveguide that allows light to propagate through it (e.g., via total internal reflection). In FIG. 1B, the exit aperture 111 is at a focal plane of the collimator GRIN 107. The fiber 101 includes a core surrounded by a cladding (e.g., it is a multimode or multicore fiber). The fiber 101 may be a gradient (or graded) index fiber or a step-index fiber. Although many types of fibers can be used, inclusion of the GRIN lens assembly 103 in the optical system 100 may be advantageous when the fiber type produces a spot at the exit aperture 111 that is larger than a sensing area of the detector 105 (further described below). Example multimode fiber sizes are 50/125 micrometers (μm) and 62.5/125 μm (where the first number in a size indicates the diameter of the core and the second number in the size indicates the diameter of the cladding). In some embodiments, a fore optic is placed between the fiber 101 and the GRIN assembly 103. This may improve or simply the GRIN lens assembly.

Light propagating in the fiber 101 may be generated by any number of optical sources and may depend on the application of the optical system 100. In some embodiments, the light is from an optical source emitting data encoded light (e.g., for fiber-optic communications or free space optical communications). The bandwidth of the light may be on the order of GHz (gigahertz).

The optical detector 105 (also referred to as an optical sensor) detects light and produces an (e.g., electrical) output signal indicative of the received light (e.g., indicative of the optical power). In FIG. 1B, the detector 105 is at a focal plane of the focuser GRIN 109. The detector 340 may include one or more photodetectors. In some embodiments, the detector is a high bandwidth detector (e.g., configured to operate on the order of GHz, such as 10-50 GHz). The size of the sensing area may be limited though. Example diameters for the detector sensing area for high bandwidth detectors are between 15 and 25 μm. In one example, the diameter is 16 μm. In some embodiments, the size of the sensing area is smaller than the spot size of light at the exit aperture 111 or output of the GRIN focuser 109.

The GRIN lens assembly 103 includes one or more GRIN lenses positioned between the fiber 101 and the detector 105 that couple (e.g., focus) light from the exit aperture 111 onto the detector 105 such that spot size of light exiting the GRIN lens assembly 103 is smaller than the spot size of light exiting the fiber 101. Said differently, the GRIN assembly 103 decreases the size of the energy distribution of light exiting the fiber 101. For example, the GRIN assembly 103 decreases the fiber spot size (e.g., diameter) by a factor of two or more (e.g., diameter from 50 μm to 20 μm). In some embodiments, the spot size of light exiting the GRIN lens assembly 103 is smaller or equal to the size of the sensitive area of the detector 105. Decreasing the spot size is advantageous (e.g., for high (multi-GHz) communications applications), when the detector sensing area is small (e.g., a diameter of 25 μm or less). For example, without a GRIN assembly, an optical system may experience high signal losses and detrimental signal variability because the detector is not large enough to "catch" all exiting light modes across the core of the fiber 101 (thus, the GRIN assembly enables optical systems to collect light signals more efficiently). In some embodiments, the GRIN assembly 103 has a higher numerical aperture than that fiber 101.

As the name suggests, a GRIN lens is a type of optical lens (it may also be considered a type of optical waveguide). A GRIN lens has a varying refractive index that produces wavefront curvatures (e.g., to make light converge or diverge). For example, in a focusing or collimating GRIN lens, the refractive index decreases in the radial direction. Similarly, in a defocusing GRIN lens, the refractive index increases in the radial direction. Non-GRIN lenses, in contrast, typically have varying thicknesses (along the optical axis) that produce wavefront curvatures. However, a GRIN lens may also have a varying thickness along the optical axis. GRIN lenses typically have a cylindrical rod shape, although a wide range of other shapes are possible.

The refraction index of a rod GRIN lens may be described by:

$$n(r,z)=n_0+n_{r2}r^2+n_{r4}r^4+n_{z1}z+n_{z2}z^2+n_{z3}z^3,$$

where $n(r,z)$ is the refractive index of the GRIN lens as a function of the radial distance from the lens center r and distance along the lens thickness z, $n_0$ is the refractive index on the lens axis of symmetry, coefficients $n_{r2}$ and $n_{r4}$, describe the radial dependence of the refractive index, and coefficients $n_{z1}$, $n_{z2}$, and $n_{z3}$ describe the along-the-path dependence of the refractive index. For example, in the case of utilized COTS GRIN lenses, $n_0=1.524$, $n_{r2}=-0.015$, $n_{r4}=0.0001$ and all other coefficients are zero.

In the example of FIGS. 1A and 1B, the GRIN assembly 103 includes two GRIN lenses coupled together: a collimator GRIN 107 and a focuser GRIN 109. The collimator GRIN lens 107 collimates the diverging light from exit aperture 111, and the focuser GRIN lens 109 focuses the collimated light onto the detector 105. The collimator GRIN 107 is longer (along the optical axis) than the focuser GRIN 109 (thus the collimator has a longer focal length than the focuser). For example, the collimator GRIN 107 is 10 mm (millimeters) long and the focuser GRIN 109 is 5 mm long.

The GRIN lens assembly 103 is not required to only include GRIN lenses. A GRIN lens assembly may include other supportive or complementary components. For example, a GRIN lens assembly includes non-GRIN lenses that help focus light.

Furthermore, although the GRIN assembly 103 includes two GRIN lenses, a GRIN assembly is not required to have exactly two GRIN lenses. In alternative embodiments, a GRIN assembly may include one, three, or more GRIN lenses to achieve the optical system described herein. If a GRIN assembly includes multiple GRIN lenses, it may be preferred for the lenses to have similar diameters so they can be easily aligned with each other. Furthermore, it may be advantageous for adjacent surfaces (of adjacent GRIN lenses) to have similar indices of refraction to reduce (or eliminate) reflection as light propagates from one GRIN lens to the other.

The optical system 100 with the GRIN assembly 103 provide many advantages. Firstly, the GRIN assembly 103 increases the amount of light coupled into the detector 105 (in other words, the GRIN assembly 103 increases the coupling efficiency) compared to a similar optical system without a GRIN assembly 103 (e.g., a system where the fiber 101 is directly coupled to the detector). In some embodiments, the GRIN assembly 103 results in more than 95% of the light exiting the fiber being coupled onto the detector 105

The GRIN assembly 103 may also be advantageous if the optical system 100 is expected to experience vibrations (e.g., on the order of kHz) while in operation (e.g., the optical system 100 will be coupled to a moving vehicle), or if the fiber is expected to change shape (e.g., bend) while the optical system 100 is in operation. For example, if the fiber 101 is a multimode fiber, the modes propagating in the fiber have different field distributions and different propagation properties. For this reason, small changes in signal coupling at the input or output of the fiber can lead to variations in energy distribution between the modes and can significantly change the fraction of input signal appearing at the output. Similarly, changes in the shape of the fiber (e.g., fiber bending) may also affect the energy distribution at the output of the fiber. If a fiber is directly coupled to a detector (without a GRIN assembly), the amount of light coupled into the detector may vary. However, since the GRIN assembly further focuses the light from the fiber, the variations (e.g., due to vibrations) in mode energy are reduced (or eliminated) because more (e.g., a majority or all) modes are coupled into the detector.

Another advantage of the GRIN assembly is that aligning two or more GRIN lenses may be easier than aligning non-GRIN lenses (non-GRIN lenses may require a complex alignment process to ensure the optical axes of the different lenses are aligned). For example, two GRIN lenses may be aligned by simply placing their ends together.

In the examples of FIGS. 1A and 1B, the adjacent components are directly coupled together (said differently the adjacent components are in physical contact). For example, the fiber 101 is directly coupled to the left end of the collimator GRIN 107, and the right end of the of the focuser GRIN 109 is directly coupled to the detector 105. However, direct coupling between adjacent components isn't required (e.g., adjacent components are spaced apart and an intermediate component or material (e.g., free space) is between the adjacent components), and in some cases, direct coupling between specific adjacent components is undesirable. For example, in operating conditions with vibrations, if the fiber 101 is directly coupled to a surface of the GRIN assembly 103, the fiber 101 may rub against the surface and scratch it. To remedy this, a transition fiber (also referred to as a patch fiber or a patch cable) may be placed between the fiber 101 and the GRIN assembly 103 to reduce or eliminate the fiber 101 rubbing against the GRIN assembly 103. For example, an end of the transition fiber is glued to or embedded in a portion of the GRIN assembly 103. The other end of the transition fiber may be optically coupled to the fiber 101. In addition to reducing rubbing, the transition fiber may also make it easier to replace the fiber 101. Thus, use of the transition fiber may improve the optical system 100 (but it may also make the optical system 100 more expensive and difficult to manufacture compared to (e.g., directly) coupling the fiber 101 to the GRIN assembly 103).

In some embodiments, optically transparent glue is placed between the GRIN assembly 103 and the detector 105. The thickness of the glue may be between 1 and 10 µm in thickness (along the optical axis). The glue may be, for example, at least 65% transparent, depending on the type and thickness of the glue. Because the glue is not perfectly transparent, the glue may scatter a portion of light (thus mixing the propagation modes) from the GRIN assembly 103 before it is received by the detector 105. Although the scattering may result in some optical losses (e.g., some scattered light may not reach the detector), the mode mixing may help make the optical system 100 mode independent, thus increasing overall performance of the optical system 100. Mode independence may be useful when the spot size (e.g., diameter) of light exiting the GRIN assembly 103 is larger than the detector sensing area. For example, the spot diameter is approximately 20 µm but the sensing area diameter can be, for example, 16 µm. In addition to, or alternative to, scattering a portion of light, the glue may help keep the detector 105 at a fixed distance from the GRIN assembly 103, resulting in more consistent light detection. Keeping the detector at a fixed distance may be particularly helpful in embodiments where the optical system 100 is expected to (e.g., regularly) experience vibrations.

Figure 2:
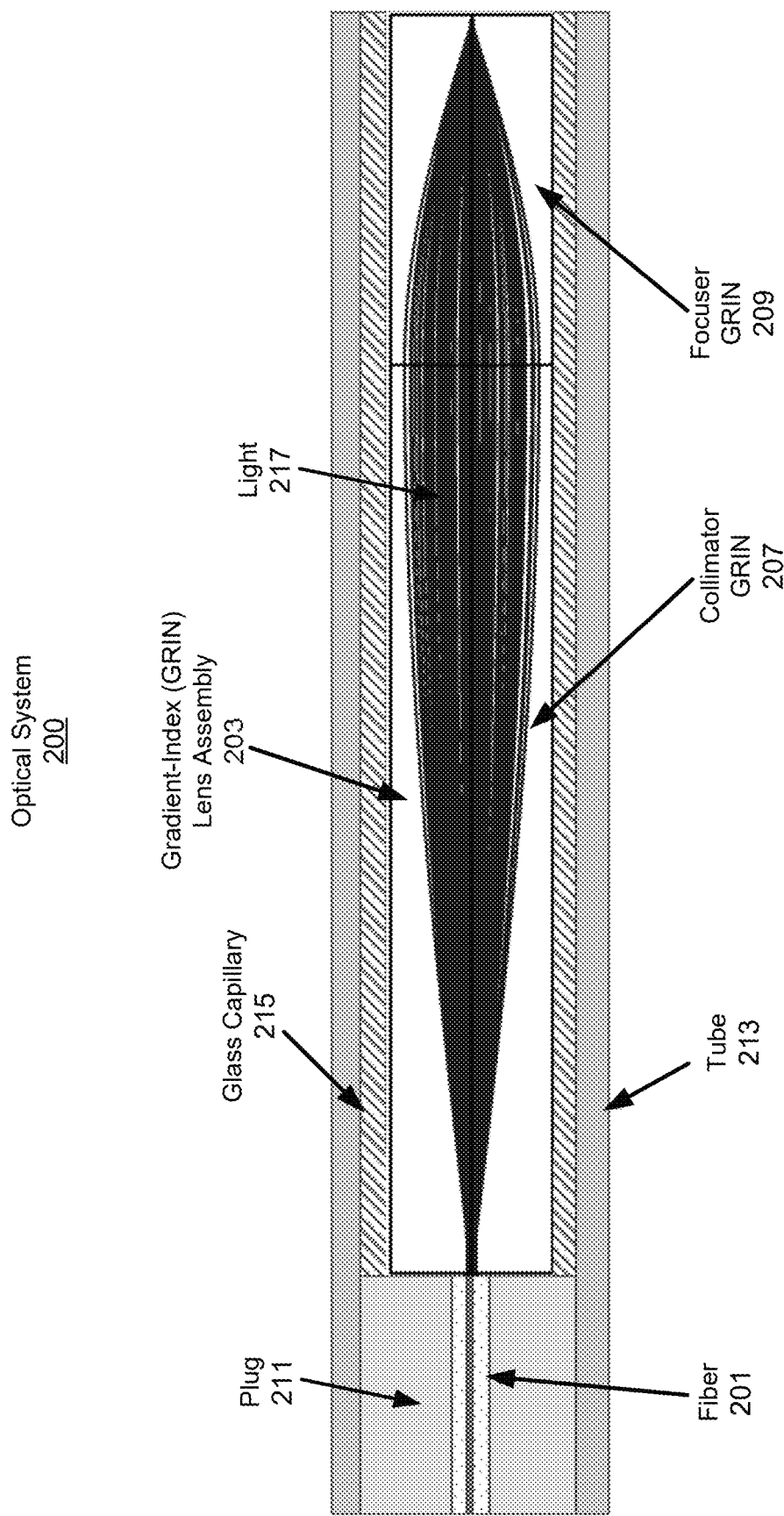
FIG. 2 is another diagram of an optical system, according to an embodiment.

FIG. 2 is another example embodiment of an optical system. Similar to FIGS. 2A and 2B, the optical system 200 includes light 217 propagating through a fiber 201 and a GRIN lens assembly 203, where the GRIN assembly 203 includes a collimator GRIN 207 and a focuser GRIN 209 (the detector is omitted for simplicity). The optical system 200 also includes a plug 211, a glass capillary 215, and a tube 213. The plug 211 holds the fiber 201 in place. The glass capillary 215 holds the lenses in the GRIN assembly 203 in place. The tube 213 surrounds the components and holds them in place (e.g., even in the presence of vibrations), thus making the system more robust. The tube 213 can also help keep moisture out of system 200.

Figure 3B:
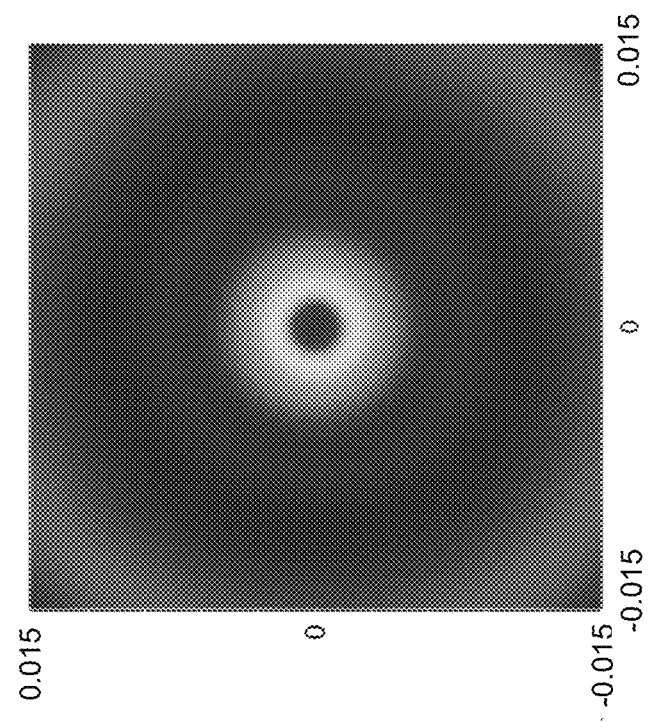
FIG. 3B is a power plot of light exiting a GRIN lens assembly of an optical system, according to an embodiment.
Figure 3A:
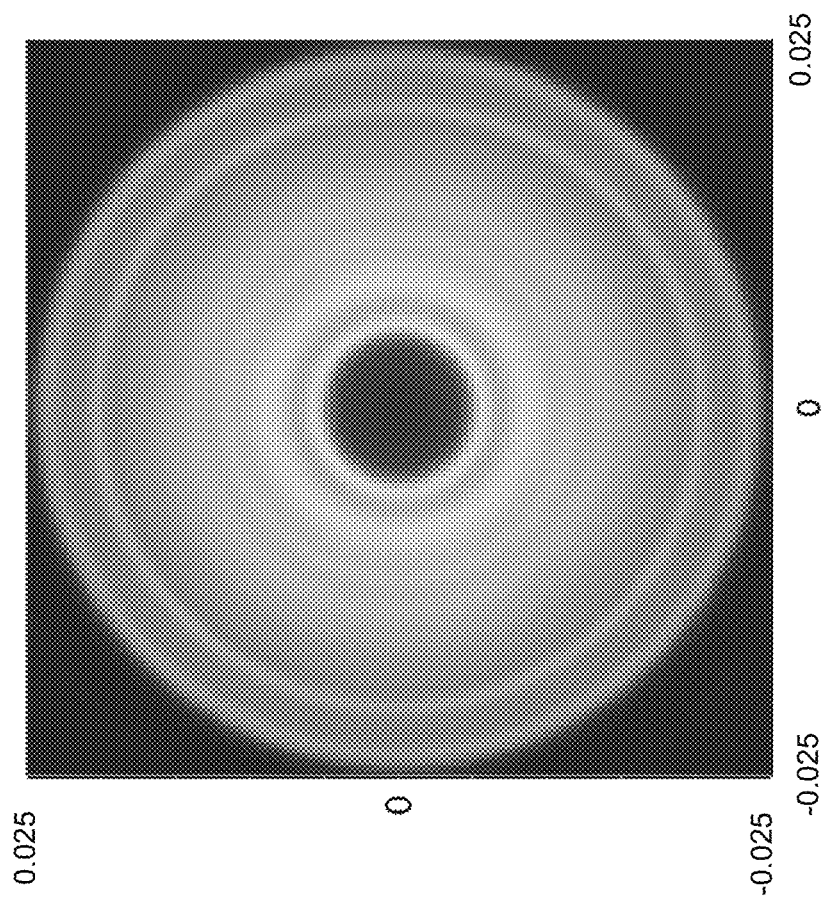
FIG. 3A is a power plot of light exiting a fiber of an optical system, according to an embodiment.

FIGS. 3A and 3B are example plots of the power distributions (perpendicular to the optical axis) at different segments of an optical system (e.g., 100). These plots were generated using a simulation program. FIG. 3A is a power plot of light exiting a fiber (e.g., 101) of the optical system, and FIG. 3B is a power plot of light exiting a GRIN lens assembly (e.g., 103) of the optical system (note that the scales are different between the two plots). These plots illustrate that the spot size of light exiting the GRIN assembly is smaller than the spot size of light exiting the fiber.

Figure 4A:
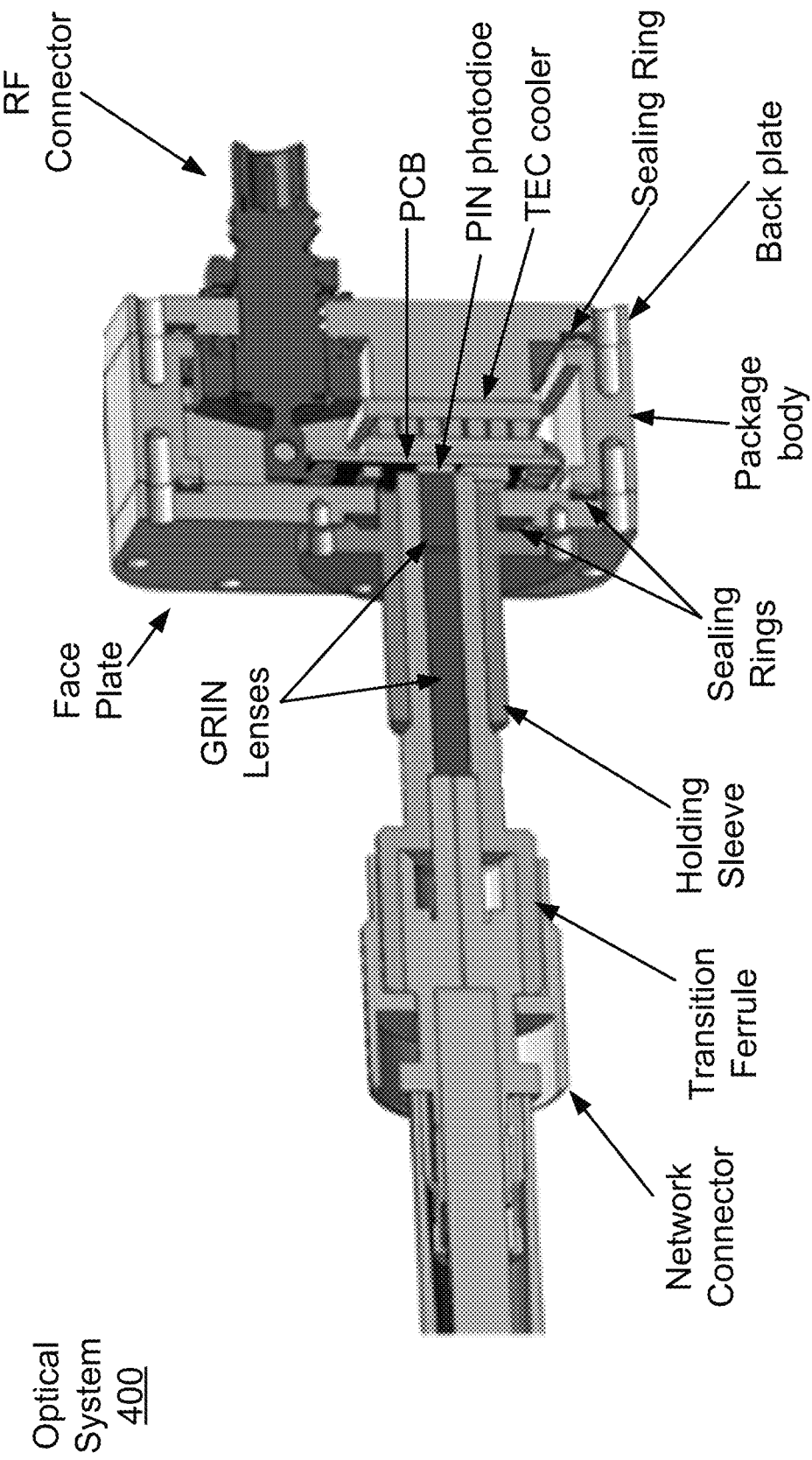
FIGS. 4A-4C illustrate various view of example optical system, according to an embodiment.
Figure 4B:
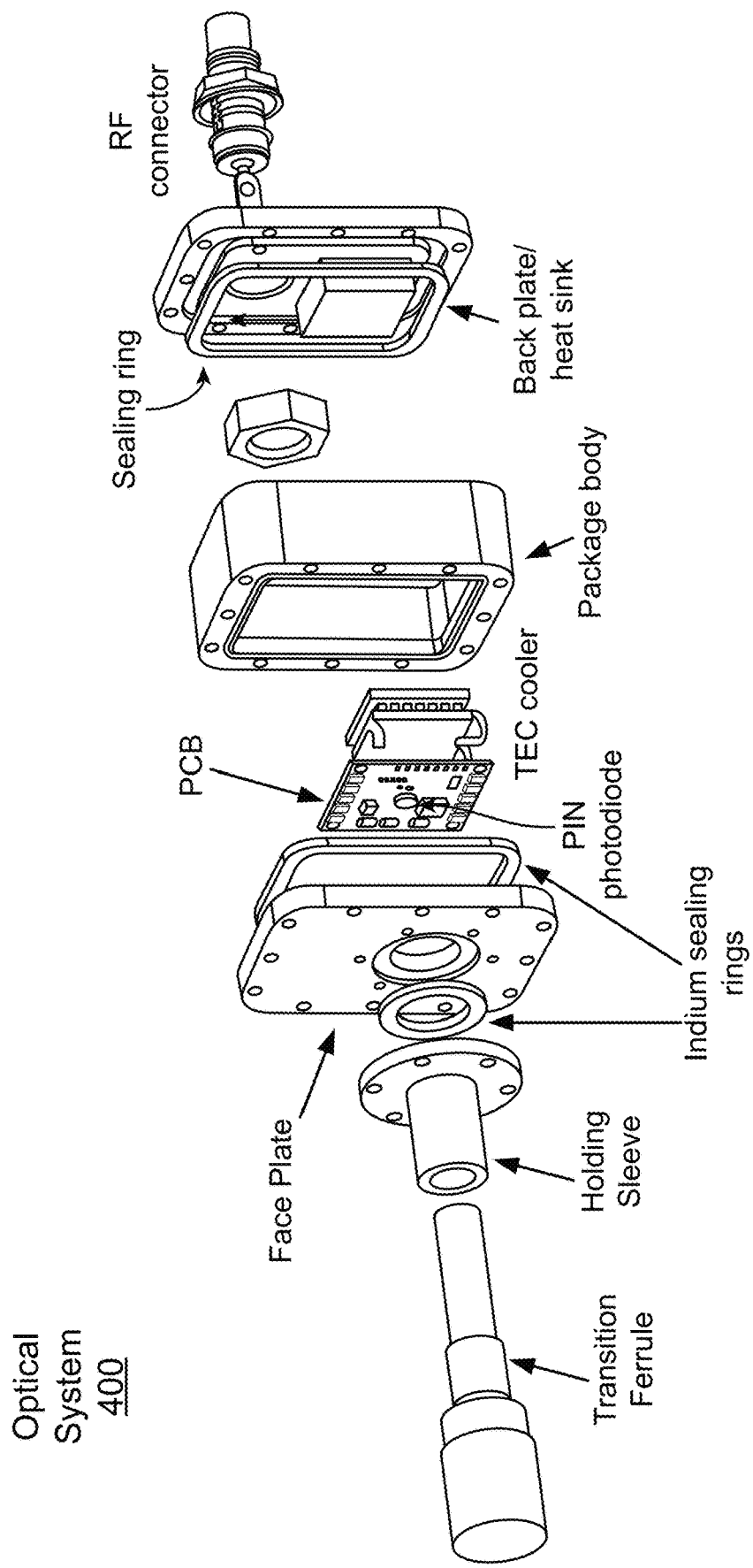
Figure 4C:
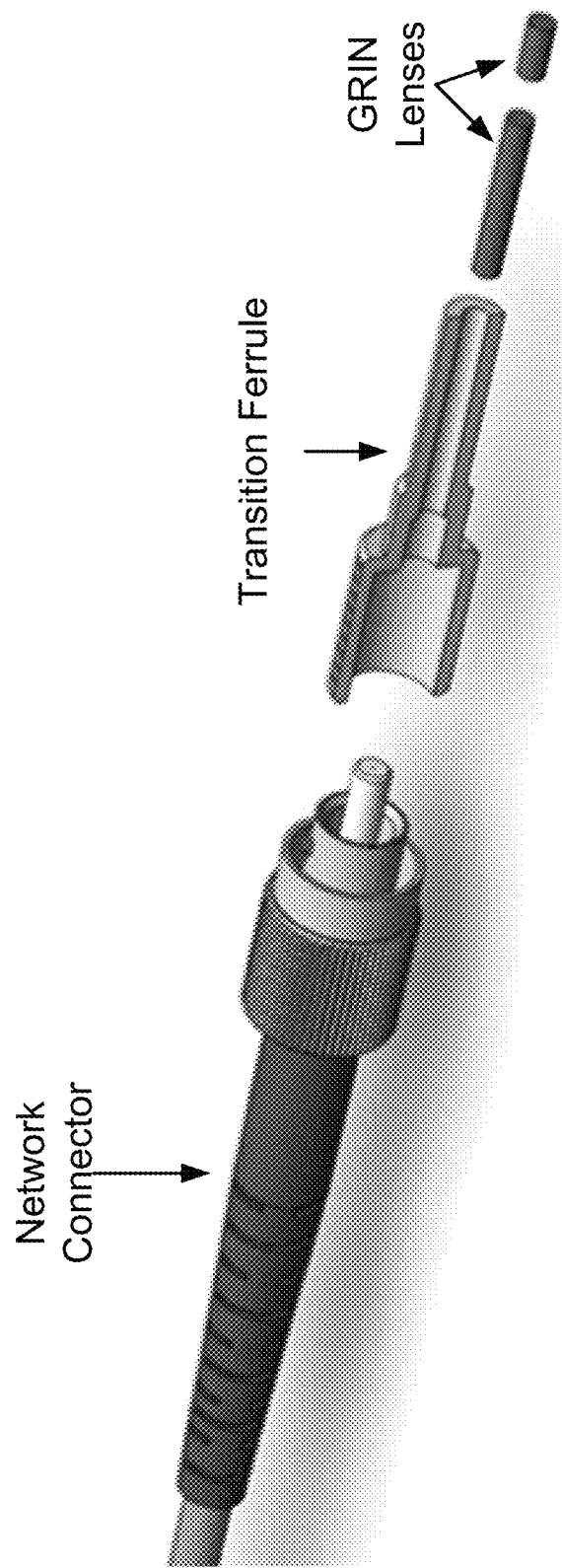

FIGS. 4A-4C illustrate various view of another example optical system 400. FIG. 4A is a cross-section diagram, and FIGS. 4B and 4C are exploded views of the optical system 400. The optical system 400 includes a network connector (including a fiber), a transition ferrule, a holding sleeve, two GRIN lenses (an example of a GRIN assembly), sealing rings, a face plate, a package body, a back plate, a heat sink, a thermoelectric (TEC) cooler, a PIN photodiode (an example detector), a PCB (printed circuit board), and a RF connector.

The GRIN lens assembly can be used for other optical systems than those described above. For example, a GRIN assembly is used to couple light from a multimode fiber into a single mode fiber (e.g., replace detector 105 in optical system 100 with a single mode fiber). In this example, GRIN lens assembly may have a higher numerical aperture than the multimode fiber. In some embodiments, the GRIN assembly is applicable to other optical components with exit areas, such as telescopes and microscopes with an exit area (the exit area refers to an exit aperture, a focal plane, or focal point of the optical component). For example, replace fiber 101 with exit aperture 111 in optical system 100 with a telescope or microscope with an exit focal point or plane. In such embodiments, the exit area may have uncontrolled movement. The movement may, by way of example, be caused by mechanical vibration. In telescope applications, the movement may be caused by atmospheric turbulence. In short-range optical communication systems (free space optical communication terminals), the movement may be caused by the parallax effect between transmitters and receivers when two communicating systems having fixed-orientation transmitter and receiver come closer together.

ADDITIONAL CONSIDERATIONS

Although the detailed description contains many specifics, these should not be construed as limiting the scope of the invention but merely as illustrating different examples. It should be appreciated that the scope of the disclosure includes other embodiments not discussed in detail above. Various other modifications, changes, and variations which will be apparent to those skilled in the art may be made in the arrangement, operation, and details of the method and apparatus disclosed herein without departing from the spirit and scope as defined in the appended claims. Therefore, the scope of the invention should be determined by the appended claims and their legal equivalents.

Note that the components illustrated and described can include any electronics and/or computer instructions that may be embodied in digital or analog circuits. This may be implemented using any one or more of Application Specific Integrated Circuits (ASICs), field-programmable gate arrays (FPGAs), and general-purpose computing circuits, along with corresponding memories and computer program instructions for carrying out the described operations. The specifics of these components are not shown for clarity and compactness of description.

Alternate embodiments are implemented in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

The term "module" is not meant to be limited to a specific physical form. Depending on the specific application, modules can be implemented as hardware, firmware, software, or combinations of these. Furthermore, different modules can share common components or even be implemented by the same components. There may or may not be a clear boundary between different modules, even if drawn as separate elements in the figures.

Depending on the form of the components, the "coupling" between components may take different forms. For example, dedicated circuitry can be coupled to each other by hardwiring or by accessing a common register or memory location, for example. Software "coupling" can occur by any number of ways to pass information between software components (or between software and hardware, if that is the case). The term "coupling" is meant to include these examples and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values or quantities should be construed as accurate +/−10% unless another meaning is apparent from the context. From example, "approximately ten" should be understood to mean "in a range from nine to eleven."

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. An optical system comprising:
   an optical component having an exit area;
   an optical detector configured to detect light incident on the optical detector; and
   a gradient-index (GRIN) lens assembly positioned between the optical component and the optical detector, the GRIN lens assembly configured to couple light from the exit area of the optical component onto the optical detector, the GRIN lens assembly comprising:
      a collimator GRIN lens configured to receive light from the exit area and collimate the received light; and
      a focusing GRIN lens configured to focus the collimated light toward the optical detector, the collimator GRIN lens having a longer focal length than the focusing GRIN lens,
   wherein a spot size of light exiting the optical component is larger than a spot size of light exiting the GRIN lens assembly.

2. The system of claim 1, wherein the optical component is a telescope and the exit area is a focal plane of the telescope.

3. The system of claim 1, wherein the optical component is a microscope and the exit area is a focal plane of the microscope.

4. The system of claim 1, wherein the optical component is an optical fiber and the exit area is an exit aperture of the optical fiber.

5. The system of claim 4, wherein the optical fiber is a multimode optical fiber.

6. The system of claim 1, wherein a numerical aperture of the optical component is less than a numerical aperture of the GRIN lens assembly.

7. The system of claim 1, wherein the GRIN assembly is directly coupled to the optical component and the optical detector.

8. The system of claim 1, wherein a spot area of the light exiting the GRIN lens assembly is smaller than a sensing area of the optical detector.

9. The system of claim 1, wherein the exit area of the optical component is at a focal plane of the GRIN lens assembly.

10. The system of claim 1, wherein the optical detector is at a focal plane of the GRIN lens assembly.

11. The system of claim 1, wherein the optical detector is configured to detect light at frequencies on the order of gigahertz.

12. The system of claim 1, wherein GRIN lens assembly couples greater than 95% of light emitted from the optical component onto the optical detector.

13. The system of claim 1, wherein the spot size of light exiting the optical component is at least twice as larger than the spot size of light exiting the GRIN lens assembly.

14. The system of claim 1, wherein a spot area of the light exiting the GRIN lens assembly is equal to or larger than a sensing area of the optical detector.

15. The system of claim 1, further comprising transparent glue between the GRIN lens assembly and the optical detector, the transparent glue configured to scatter a portion of light exiting the GRIN lens assembly.

16. The system of claim 15, wherein the transparent glue is further configured to hold the optical detector at a fixed distance from the GRIN lens assembly.

17. The system of claim 15, wherein a thickness of the transparent glue along the optical axis is between 1 and 10 µm.

18. An optical system comprising:
an optical component having an exit area;
an optical detector configured to detect light incident on the optical detector; and
a gradient-index (GRIN) lens assembly positioned between the optical component and the optical detector, the GRIN lens assembly configured to couple light from the exit area of the optical component onto the optical detector, the GRIN lens assembly comprising:
a collimator GRIN lens configured to receive light from the exit area and collimate the received light; and
a focusing GRIN lens configured to focus the collimated light toward the optical detector, the collimator GRIN lens being longer than the focusing GRIN lens,
wherein a spot size of light exiting the optical component is larger than a spot size of light exiting the GRIN lens assembly.

19. An optical system comprising:
an optical component having an exit area;
an optical detector configured to detect light incident on a sensing area of the optical detector, a spot size of light exiting the optical component being larger than the sensing area of the optical detector; and
a gradient-index (GRIN) lens assembly positioned between the optical component and the optical detector, the GRIN lens assembly configured to couple light from the exit area of the optical component onto the optical detector, a spot size of light exiting the GRIN lens assembly being smaller than the sensing area of the optical detector.

20. The system of claim 19, wherein to couple light from the exit area onto the optical detector, the GRIN lens assembly is configured to receive light from the exit area, collimate the received light, and focus the collimated light toward the optical detector.

* * * * *